United States Patent Office 3,764,370
Patented Oct. 9, 1973

3,764,370
PROCESS FOR COATING POLYMERIC SURFACES
Robert A. Bragole, Danvers, Mass., assignor to USM Corporation, Boston, Mass.
No Drawing. Continuation-in-part of abandoned application Ser. No. 887,348, Dec. 22, 1969. This application Nov. 23, 1971, Ser. No. 201,541
Int. Cl. B44d 1/50, 5/12
U.S. Cl. 117—47 A    8 Claims

ABSTRACT OF THE DISCLOSURE

The process of coating a polymer resin including the steps of cross linking the surface of the resin and generating "living" radicals at the surface of the resin by ultraviolet light radiation and thereafter applying a polymeric resin coating composition including groups which will combine with the suface through the action of the "living" radicals.

---

This application is a continuation-in-part of application Ser. No. 887,348, filed Dec. 22, 1969, now abandoned.

FIELD OF THE INVENTION

This invention relates to a process for coating resin surfaces particularly of olefin polymer resins.

BACKGROUND OF THE INVENTION

Processes heretofore proposed for coating of resins such as polyethylene, to which paints and lacquers do not normally adhere well, have employed treatments effective to improve the wettability of the surface and/or generate chemically reactive groups, generally hydroxyl groups at the resin surface for chemical reaction with reactive groups such as isocyanate or epoxide. Increase in wettability alone allows the formation of coatings which are satisfactory for some purposes; but quite generally, the treatment that gives increase in wettability, generates at the same time a weak boundary layer which limits the ultimate strength of union between the coating and the resin surface. Coatings in which there is a chemical reaction between reactive groups at the resin surface and reactive groups in the coating often adhere quite strongly; but the requirement of the presence of chemically reactive groups such as isocyanate or epoxide excludes from use many of the coating compositions such as acrylic and methacrylic lacquers which are easier of application and provide coatings having properties which are outstanding for many purposes.

SUMMARY OF THE INVENTION

It is an object of the present invention to provide a coating process for forming a strongly adherent coating with compositions which do not require chemically reactive groups for establishing a strong bond to the resin surface.

To this end and in accordance with a feature of the present invention, the resin surface to be coated is treated to generate at the resin surface an integral cross-linked, strong bonding layer having a low angle of wetting and to provide a concentration of "living" or free radicals and the treated surface is coated with a polymeric resin composition which includes groups which will interact with the resin surfaces in which the free radicals were generated.

DESCRIPTION OF THE PREFERRED EMBODIMENTS

Applicant has discovered that ultraviolet radiation of a resin surface carrying a ketone or multi-ring hydrocarbon photosensitizer effects a profound and permanent alteration of the resin surface which remains even after wiping or solvent treatment and will join strongly to coatings such as paints and lacquers applied to it.

More particularly, it appears that radiation in the presence of the selected photosensitizer produces a cross-linked surface layer which is integral with the main body of resin so that there is a strong tough layer in contrast to surface generation of halogen compounds constituting a weak boundary layer through ultraviolet radiation of resins in the presence of halogen compounds. Moreover, as part of the action of ultraviolet radiation with ketone or multi-ring hydrocarbon photosensitizer there is generated a surface layer having a lower angle of wetting and a concentration of "living" radicals effective to give outstanding adhesion and resistance to separative action, for example, on soaking in water.

Materials which are treated according to the process of the present invention are low surface tension of wetting substrates which because of this characteristic are difficult to wet and bond with adhesives. Materials considered as having low surface energy are those of which the critical surface tension of wetting is 35 dynes per centimeter or less as determined by contact angle measurements. (See p. 20 of "Contact Angle, Wettability and Adhesives," No. 43 of the "Advances in Chemistry Series," published 1964 by the American Chemical Society.) Included in the category are polyethylene, polypropylene, copolymers of ethylene and propylene alone or with a very low percentage of a non-conjugated diene, e.g. the commercial terpolymer EPDM comprising about 64% ethylene, about 34% propylene and about 2% 1,4 hexadiene, copolymers of ethylene or propylene with other monomers such as vinyl acetate or ethyl acrylate and fluorine-containing polymers such as polyvinyl fluoride and polyvinylidene fluoride. Polymers for treatment by the present process must have at least some hydrogen on a carbon chain in a repeating unit in the polymer chain.

It has also been found that bodies of other resins which, because of surface contamination by mold release or demolding agents or other surface action occurring in the course of molding, are difficult to coat uniformly, may be coated with strongly adherent coats by following the process of the present invention. Included in such resin materials are resins which theoretically are easy to coat but are difficult to coat in practice, including the commercially available acetal resin materials known as Celcon and Delrin, high moecular weight polyamides such as nylon (Zytel) and polycaprolactam (Vykan-A), polyurethanes and ionomer resin materials such as the material available as Surlyn-A which is understood to be a metallic salt of an acrylic acid copolymer.

In every case, the resin surface to be coated must have at least some hydrogen on a carbon chain in a repeating unit in the polymer chain.

The first step in the process is the treatment of the surface of the polymer resin material by ultraviolet radiation in the presence of a ketone or multiple hydrocarbon ring photosensitizer. The ultraviolet radiation bombards the surface of the polymer resin with photons which excite the molecules and cause chemical and electronic changes in the surface molecules. The presence of the ultraviolet radiation photosensitizer at the polymer resin surface increases the effectiveness of the radiation and, in excited state, the photosensitizer interacts with the resin substrate both to increase the cross linking action of the radiation and to develop "living" or "free" radicals in the polymer resin molecules at the surface of the body being radiated. It appears to be important that photosensitizers have a triplet state energy of at least about 62 kcal./mole. Preferred photosensitizers are ketone materials such as benzophenone, acetophenone, benzoin, 2-acetonaphthone, hydrocarbon multiple ring compounds such as acenaphthene and fluorene. Halogenated hydrocarbons such as methylene chloride, trichloroethylene and chloroform have some effect in generating free radicals but produce a chlorination rather than a cross linking action at the surface of the irradiated polymer resin, and, in contrast with the ketone type of phootsensitizers, give a marked change in the surface tension of wetting and in the hydrophilic character of the surface of the polymer resin body so that wettability is increased and resistance to water of an applied coating is decreased. Because the halogenated hydrocarbon photosensitizers do not have the strong crosslinking action of the preferred group of photosensitizers, the radiated bodies may retain a weak boundary layer which limits the strength of union between an applied coating and the treated surface.

The following equations illustrate the cross linking and living radical generation action of ultraviolet radiation.

(1)

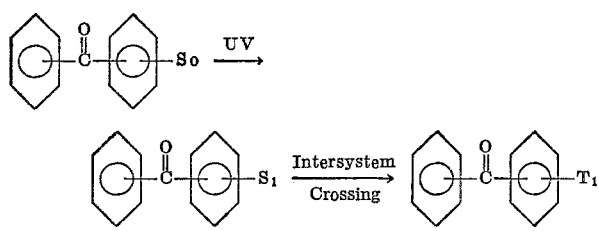

Equation one shows that when subjected to ultraviolet radiation, benzophenone is excited from the ground state to the first excited singlet state and then to the first excited triplet state.

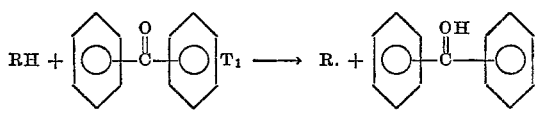

Equation two shows that the benzophenone in the triplet state acts on a surface molecule of, for example, a polyolefin resin body indicated as RH to abstract hydrogen from the polyolefin leaving the remainder of the polyolefin as a free or living radical while converting the benzophenone to a hydroxyl bearing free radical.

At this point two types of free radical induced reaction occur. As shown in Equation three, where it is sterically possible, adjacent polyolefin free radicals may combine with each other to give a cross linking effect.

(3)  R.—R.→R—R

Another cross linking mechanism is shown in the following equations:

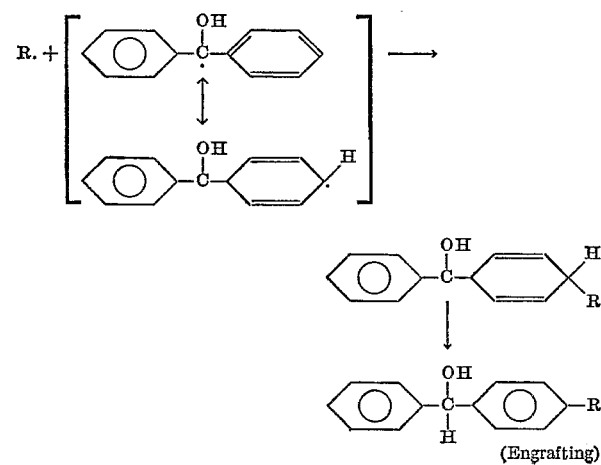

(Engrafting)

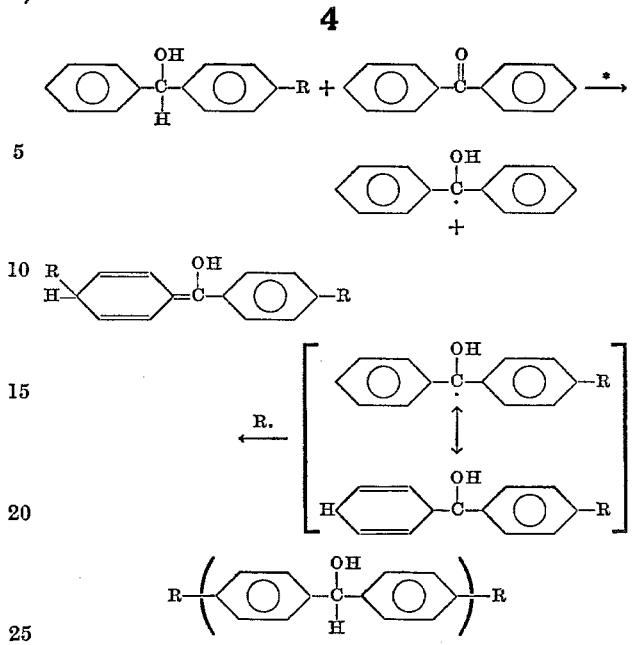

[1] Cross-linked product with photoreduced benzophenone bridge.

When coatings of resin polymers containing unsaturated compounds, particularly coatings including small percentages of monomers with vinyl or vinylidene groups, such, for example, as methyl methacrylate, are applied to the irradiated surface, the free radicals may react with such compounds to engraft them and transfer the radical activity to the added on unit which in turn can react with a further compound.

It has also been found that with many polymers such as polystyrene and the polymers and copolymers of the lower alkyl esters of acrylic and methacrylic acid, e.g. polymethyl acrylate or polymethyl methacrylate, a free radical can transfer its activity to the polymer so that, for example, the polymer becomes a free radical which is capable of interaction with other free radicals or other polymerizable material to effect a coupling of two radical species.

It will be seen from the above discussion that this ultraviolet radiation in the presence of ketone and multi-ring hydrocarbon photosensitizers not only cross link the surface of the polymer resin body to eliminate weak boundaries but also generates free radicals in the surface molecules of the resin body and these radicals produce an engrafting of both monomer and polymer components of the coating material applied to the irradiated surface to give a strong union between the coating material and the polymer resin surface.

The ultraviolet radiation for achieving the above discussed action has been found most effective at a wave length of from 2000 to 3500 A. and more preferably from 2000 to 2800 A. The degree of cross linking or radical generation is dose dependent. The surface concentration or prevalency of "free" or "living" radicals desired for improving the union of the coating material to the surface of the polymer resin body will very with the reactivity of the coating material. That is, coating materials containing less reactivity, either because of less reactive monomeric or polymeric material or lower concentrations of monomeric material, will require a higher concentration of free radicals at the surface because the overall rate of reaction which is the product of the concentration of radicals in the surface of the polymer resin and the concentration of reactive groups of the coating would be less. It appears that at least about 1000 watt seconds per square foot of radiation is needed and that with less reactive coating materials substantially higher dosages may be required.

As an example, commercial acrylic lacquers may contain small quantities of not over about 0.1% of monomer, e.g. methyl methacrylate, methacrylic acid, acrylic acid, etc., which because of their α,β unsaturation would react easily with free radicals at the surface of the polymer resin. Where all monomer has been stripped from the polymeric base of the coating so that the coating was free of monomers containing vinyl or other olefinic unsaturation, additives such as acrylic acid or other reactive agents may be incorporated in such coatings and will be available for free radical addition engrafting on a polymer resin surface containing free radicals. As little as 0.05% by weight based on the weight of the film-forming component of the paint of a monomer having a vinyl or vinylidene radical is effective markedly to reduce the dosage of radiation needed to give a strongly adherent coating. Higher percentage may be used but excess residual monomer in the final coating is unacceptable because of bleeding to the surface, odor and other problems so that the coating composition should not contain over about 5% of such monomer.

On the other hand, polyurethane and epoxy coatings and paints derived from materials having substantially no olefinic unsaturation and having very little or no residual —NCO or epoxy functionality have less reactivity and will require a higher concentration of free radicals at the polymer resin surface to achieve strong union within a practical time.

The photosensitizer is generally applied to the surface of the material in the form of a solution in a volatile solvent in the case of solid photosensitizers or as a pure or diluted liquid in the case of liquid photosensitizers. As little as 2% by weight of photosensitizer in the solution applied may be effective; but higher percentages may be used without adverse results. The important factor is presence of the photosensitizer at the surface during ultraviolet radiation and this may be secured by melting and spraying fusible solid photosensitizer on the surface or by other procedures such as dusting on a powder of the photosensitizer.

It has even been found that photosensitizers, preferably solid photosensitizers of the ketone type, may be uniformly distributed through the material to be bonded as by milling the photosensitizer into the material. Apparently sufficient of the photosensitizer reaches the surface by migration or otherwise to provide sensitizing action. To be effective in this relation there should be used at least about 0.1% by weight of the compound.

It has been observed with solid photosensitizers that their effectiveness is increased where heat sufficient to fuse the photosensitizer is applied. This may be the heat generated in the course of ultraviolet radiation. Because of this factor it is desirable to use lower melting point photosensitizers to facilitate wetting of the substrate by the photosensitizer. Of course, mixtures of photosensitizers including, for example, high and low meling point photosensitizers or components which reduce the melting point of the photosensitizer may be used.

Where the surface being treated is an elastomeric material, fusion of the photosensitizer appears to cause the photosensitizer to penetrate into the body of material, and thus avoid presence of excess photosensitizer at the surface which might constitute a weak boundary layer.

An important property of the surface prepared for coating by ultraviolet radiation is that the ability to hold coatings strongly is not destroyed by dry or solvent wiping of the surface as might be desirable to remove dust, or other contaminant such as excess photosensitizer from the surface. This is a distinct advantage over surfaces treated by other means, such as flame, to prepare them for coating.

The following examples are given to aid in understanding the invention and it is to be understood that the invention is not restricted to the procedures, materials or conditions employed in the examples.

EXAMPLE I

Plaques of high density polyethylene were brushed with a 2% solution by weight solids solution of benzophenone in trichloroethylene. The solvent was dried and the plaques subjected to ultraviolet radiation to provide the dosage listed in the following table.

The light source was an ultraviolet lamp disposed at a distance of 3.25'' from the plaques and providing a radiation wattage in far ultraviolet range at the surface of the plaques of 98 watts. After irradiation the irradiated surfaces were coated with a commercial polymethyl methacrylate primer and then with a top coating, each of the coatings being subjected to drying for about 30 minutes at 100° C. Thereafter, the paint was subjected to a standard cross hatch adhesion test in which two sets of parallel lines crossing at right angles are scribed in the paint and pressure sensitive adhesive tape is pressed down on the scribed surface and stripped off at right angles to the surface (Ford Motor Co., Quality Laboratory and Chemical Engineering Physical Test Methods—Ford MJB-11-1). The results are listed in the table.

TABLE I

| Exp. No. | Radiation dosage (watt-sec./sq. ft.) | Percent paint failure |
| --- | --- | --- |
| 1 | 0 | 100 |
| 2 | 490 | 100 |
| 3 | 980 | 50 |
| 4 | 1,470 | 50 |
| 5 | 1,960 | 30 |
| 6 | 2,450 | 5 |
| 7 | 2,940 | 0 |
| 8 | 3,430 | 0 |
| 9 | 3,920 | 0 |
| 10 | 4,410 | 0 |
| 11 | 4,900 | 0 |
| 12 | 5,390 | 0 |
| 13 | 5,880 | 0 |

Samples 7 to 13 which showed 0% paint failure also showed 0% paint failure and no blistering after immersion in water for eight days.

EXAMPLE II

Plaques of a high density copolymer of ethylene and butene-1 (Marlex) were brushed with photosensitizer solution, i.e. a 2% by weight solids solution of benzophenone in various solvents as listed in the following table and also brushed with solvents themselves without the benzophenone for comparative purposes. The treated plaques were subjected to ultraviolet radiation using the lamp and spacing used in Example I for a time to provide a radiation dosage of 3430 watt seconds per square foot. Where the solvents alone were used for treating the plaques radiation was carried out while the surfaces of the plaques were still wet with the solvent. The radiated surfaces were coated with the polymethyl methacrylate primer used in Example I and the paint was cured for one hour at 100° C.

The results of cross hatch adhesion testing are listed in Table II.

TABLE II

| Exp. No. | Sensitizer | Percent paint failure |
| --- | --- | --- |
| 1 | None | 100 |
| 2 | Benzophenone in acetone | 0 |
| 3 | Acetone | 60 |
| 4 | Benzophenone in MEK | 0 |
| 5 | Methyl ethyl ketone | 100 |
| 6 | Benzophenone in cyclohexane | 0 |
| 7 | Cyclohexane | 75 |
| 8 | Benzophenone in diethyl ether | 0 |
| 9 | Diethyl ether | 60 |
| 10 | Benzophenone in trichloroethylene | 0 |
| 11 | Trichloroethylene | 0 |
| 12 | Benzophenone in ethyl alcohol | 0 |
| 13 | Ethyl alcohol | 50 |
| 14 | Benzophenone in ethyl acetate | 0 |
| 15 | Ethyl acetate | 80 |

EXAMPLE III

Plaques of high density copolymer of ethylene and butene-1 (Marlex) were brushed with a 2% by weight solids solution of benzophenone in trichloroethylene, dried and subjected to a radiation dosage of 3430 watt seconds per square foot. After radiation, the radiated surfaces were subjected to the treatments shown in the following table. Where the plaques were dipped in solvent, the surfaces were allowed to dry before application of paint. After the listed treatment, commercial polymethyl methacrylatee primer was painted on the treated surface and the surface and the surface was cured for 30 minutes at 100° C. The results of cross hatch adhesion testing are listed in the table.

TABLE III

| Exp. No. | Post-irradiative treatment | Percent paint failure |
| --- | --- | --- |
| 1 | Solvent dip, e.g. trichloroethylene | 0 |
| 2 | Solvent dip, e.g. methylene chloride | 0 |
| 3 | Solvent dip followed by vigorous wiping with a paper towel. | 0 |
| 4 | None | 0 |
| 5 | Vigorous wiping with a paper towel | 0 |

Note.—Blistering after immersion in water for 15 days.

EXAMPLE IV

Plaques of high density polyethylene were brushed with a 2% by weight solids solution of benzophenone in trichloroethylene, dried and subject to ultraviolet radiation for the periods shown in Table IV. Thereafter various commercial paints were applied to the radiated surfaces and the paints were cured for one hour at 100° C. The cured coatings were tested by the cross hatch paint adhesion test and the results listed in the table.

TABLE IV

| Exp. No. | Radiation dosage watt-sec./sq. ft.) | Paint | Percent paint failure |
| --- | --- | --- | --- |
| 1 | 2,940 | Polymethyl methacrylate primer (Inmont). | 0 |
| 2 | 5,880 | do | 0 |
| 3 | 2,940 | Polymethyl methacrylate top coat including metallic pigment reinforcing (Inmont). | 100 |
| 4 | 5,880 | do | 40 |
| 5 | 2,940 | Metallic pigment reinforced acrylic paint (Siebert). | 65 |
| 6 | 2,940 | Urethane paint (Pontiac) | 100 |
| 7 | 5,880 | do | 15 |
| 8 | 8,820 | do | 0 |
| 9 | 2,940 | Acrylic primer coat (Ford) | 20 |
| 10 | 5,880 | do | 0 |

It can be seen from the above that where the concentration of readily engrafted components is high as in the polymethyl methacrylate primer, a given radiation dosage will give 0% paint failure, while with a coating containing a lower concentration of reactive groups, as in the urethane, a higher radiation dosage is required to secure effective paint adhesion.

The samples 1, 2, 8 and 10 which showed 0% paint failure under the cross hatch adhesion test also showed 0% paint failure and no blistering after immersion in water for seven days.

EXAMPLE V

A number of plaques of high density polyethylene and polypropylene with and without glass fiber reinforcing filler were coated with a 2% benzophenone solution in trichlorethylene and, after evaporation of the solvent from the coating, were subjected to ultraviolet radiation to provide the radiation dosage listed in the following table. After radiation, commercial primers and/or paints were applied to the radiated surface as listed in the table and the paints were cured for one hour at 100° C. Where a primer coating and a top coating were both applied, each coating was cured for one hour at 100° C. The paint coatings were tested with the cross hatch paint adhesion test and the results listed in the table.

TABLE V

| Exp. No. | Substrate | Radiation dosage (watt-sec./sq. ft.) | Paint | Percent paint failure |
| --- | --- | --- | --- | --- |
| 1 | Polypropylene | 1,470 | Poylmethyl methacrylate primer and metal pigmented polymethyl methacrylate top coat (Inmont). | 0 |
| 2 | do | 2,940 | do | 0 |
| 3 | do | 0 | do | 100 |
| 4 | do | 1,470 | Polymethyl methacrylate primer (Inmont) | 0 |
| 5 | do | 2,940 | do | 0 |
| 6 | do | 1,470 | Polymethyl methacrylate top coat (Inmont) | 2 |
| 7 | do | 2,940 | do | 0 |
| 8 | do | 1,470 | Acrylic primer (Ford) | 3 |
| 9 | do | 2,940 | do | 0 |
| 10 | do | 0 | do | 100 |
| 11 | do | 1,470 | Polymethyl methacrylate top coat (Siebert) | 3 |
| 12 | do | 2,940 | do | 0 |
| 13 | do | 0 | do | 100 |
| 14 | do | 1,470 | Polyurethane paint (Pontiac) | 100 |
| 15 | do | 2,940 | do | 100 |
| 16 | do | 0 | do | 100 |
| 17 | High density polyethylene | 2,940 | Polymethyl methacrylate primer and metal pigmented polymethyl methacrylate top coat (Inmont). | 0 |
| 18 | do | 0 | do | 100 |
| 19 | do | 8,820 | Polyurethane Paint (Pontiac) | 0 |
| 20 | do | 0 | do | 100 |
| 21 | do | 5,880 | Acrylic primer (Ford) | 0 |
| 22 | do | 0 | do | 100 |
| 23 | High density polyethylene reinforced with glass fibers. | 2,940 | Polymethyl methacrylate primer and metal pigmented polymethyl methacrylate top coat (Inmont). | 0 |
| 24 | do | 5,880 | Polymethyl methacrylate primer (Inmont) | 0 |
| 25 | do | 0 | do | 100 |
| 26 | do | 8,820 | Polyurethane paint (Pontiac) | 0 |
| 27 | do | 0 | do | 100 |
| 28 | do | 5,880 | Acrylic primer (Ford) | 0 |
| 29 | do | 0 | do | 100 |
| 30 | High density polyethylene reinforced with 30% glass fibers. | 2,940 | Polymethyl methacrylate primer and metal pigmented polymethyl methacrylate top coat (Inmont). | 0 |
| 31 | do | 5,880 | Polymethyl methacrylate primer | 0 |
| 32 | do | 0 | do | 100 |
| 33 | do | 8,820 | Polyurethane paint (Pontiac) | 0 |
| 34 | do | 0 | do | 100 |
| 35 | do | 5,880 | Acrylic primer (Ford) | 0 |
| 36 | do | 0 | do | 100 |

EXAMPLE VI

Polyethylene plaques were brushed with a 2% solution of benzophenone in methyl ethyl ketone, dried and subjected to ultraviolet radiation for the dosage listed in the following table. Thereafter, the surface of one of the plaques was wiped with acrylic acid. Each of the plaques was coated with a polymethyl methacrylate coating (Inmont). In one of the examples 1/10 gram of a 70% solution of acrylic acid in methyl ethyl ketone was added to one gram of the polymethyl methacrylate paint. The painted surfaces were cured for 20 minutes at 155 to 160° F. and subjected to the cross hatch paint adhesion test. It is to be noted that while a radiation dosage of 3430 watt seconds per square foot provided sufficient active free radicals at the radiated surface for combination with engraftable groups in the polymethyl methacrylate paint, a radiation of only 1960 watt seconds per square foot was not sufficient to provide the necessary number of free radicals as shown by the 50% paint failure in experiment number 2. The provision of acrylic acid at the interface between the radiated surface and the paint either by a preliminary acrylic acid wipe or by inclusion of a 70% solution of acrylic acid in methyl ethyl ketone in the paint provides sufficient groups which cooperate with the free radicals at the irradiated surface to provide 0% paint failure.

Samples 2, 4 and 6 which showed 0% paint failure in the cross hatch test showed 0% paint failure and no blistering after immersion in water for ten days.

EXAMPLE VIII

A series of high density polyethylene plaques were brushed with a 2% solution of benzophenone in methylene chloride, dried for one minute and subjected to ultraviolet radiation for the dosage listed in the following table. Thereafter, the radiated surface was subjected to the treatments listed in the table and the surfaces of the plaques were then coated with a two-part commercial epoxy coating comprising substantially stoichiometric proportions of a glycidyl polyether of bisphenol-A, and as a curing agent, an aliphatic diamine amine. The coated surfaces were cured for 15 minutes at 180° F. and subjected to the cross hatch adhesion test.

A second series of high-density polyethylene plaques was dipped in trichloroethylene and subjected to ultraviolet radiation for the dosage listed in the following table. These radiated surfaces were subjected to the treatment noted in the table after radiation, were coated, cured and subjected to the cross hatch adhesion test.

TABLE VI

| Exp. No. | Substrate | Radiation dosage (watt-sec./sq. ft.) | Additional surface prep. | Paint | Percent paint failure |
|---|---|---|---|---|---|
| 1 | Polyethylene | 3,430 | None | Polymethyl methacrylate (Inmont) | 0 |
| 2 | do | 1,960 | do | do | 50 |
| 3 | do | 1,960 | (A) Acrylic acid wipe | do | 0 |
| 4 | do | 1,960 | None | (B) Polymethyl methacrylate with acrylic acid | 0 |

NOTES.—
Samples 1–4 were cured 20 min. at 155–160) F.
(A) 70% solution of acrylic acid in MEK.
(B) Made by dissolving 0.1 g. of 70% acrylic acid in MEK into 10 g. of the polymethylmethacrylate paint (Inmont).

EXAMPLE VII

Plaques were formed of various resins as indicated in the following table and the plaques were brushed with a 2% by weight solution of benzophenone in trichloroethylene, dried and subjected to ultraviolet radiation for the dosage shown in the table. The surfaces of the plaques were then coated with polymethyl methacrylate primer and cured for one hour at 100° C. The coated surfaces were subjected to the cross hatch paint adhesion test with the results listed in the table.

TABLE VII

| Exp. No. | Resin | Radiation dosage (watt-sec./sq. ft.) | Percent paint failure |
|---|---|---|---|
| 1 | Acetal | 0 | 100 |
| 2 | do | 2,580 | 0 |
| 3 | Polycaprolactam (Vykan-A) | 0 | 100 |
| 4 | do | 2,580 | 0 |
| 5 | Polyamide (Zytel) | 0 | 100 |
| 6 | do | 2,580 | 0 |

It will be noted that radiation assisted by trichlorethylene was not as effective to secure a firmly adhering coat as it was with benzophenone. More importantly, the surface generated by radiation after trichloroethylene ultraviolet treatment was not capable of retaining its coating adhesion ability when subjected to wiping or solvent treatment such as might be encountered in preparing a pre-irradiated surface for coating after a storage period.

EXAMPLE IX

To determine whether more severe trichloroethylene and ultraviolet radiation treatment might improve the adhesion of the coatings to high-density polyethylene, the following series of tests were carried out. High-density polyethylene plaques were immersed for 3 minutes in trichloroethylene and subjected to ultraviolet radiation for the dosages listed in the following table. Thereafter, the samples were, in some instances, wiped with a towel or dipped in perchloroethylene and wiped either directly before or after the heating treatment. The surfaces were then coated with the 2-part epoxy coating of the preceding example, cured for 15 minutes at 180° F. and subjected to the cross hatch adhesion test.

TABLE VIII

| Exp. No. | Substrate | Photosensitizer | Post-irradiation treatment | Radiation dosage (watt-sec./sq. ft.) | Paint | Percent paint failure |
|---|---|---|---|---|---|---|
| 1 | High density polyethylene | Benzophenone | None | 3,200 | Two-part epoxy coater | 0 |
| 2 | do | do | Wiping with paper towel | 3,200 | do | 0 |
| 3 | do | do | Dipping in perchloroethylene | 3,200 | do | 0 |
| 4 | do | do | Dipping in perchloroethylene and wiping with paper towel. | 3,200 | do | 0 |
| 5 | do | do | None | 6,400 | do | 0 |
| 6 | do | do | do | 12,400 | do | 0 |
| 7 | do | Trichloroethylene | do | 3,200 | do | 50 |
| 8 | do | do | Wiping with paper towel | 3,200 | do | 100 |
| 9 | do | do | Dipping in perchloroethylene | 3,200 | do | 100 |
| 10 | do | do | Dipping in perchloroethylene and wiping with paper towel. | 3,200 | do | 100 |
| 11 | do | do | None | 6,400 | do | 100 |
| 12 | do | do | do | 12,400 | do | 100 |

Additional polyethylene plaques were dipped in trichloroethylene for 6 minutes and further plaques dipped for 12 minutes and the plaques were subjected to ultraviolet radiation as listed in the table. Thereafter, the irradiated samples were subjected to a post-heating at 50° C. for 30 minutes, coated with the epoxy coating, cured and subjected to the cross hatch adhesion test. Some of the samples were subjected to wiping with a paper towel as indicated in the following table.

To determine the effect of repeated trichloroethylene ultraviolet radiation treatment, polyethylene plaques were treated for 3 minutes in trichloroethylene, and subjected to ultraviolet radiation for 3 minutes. These two steps were repeated 2 more times. Thereafter, the radiated samples were subjected to a post-irradiation treatment, noted in the table, coated with the epoxy coating, cured and subjected to the cross hatch adhesion test. The results are listed in the table.

EXAMPLE XI

Polyethylene plaques were brushed with a 2% solution of benzophenone in methyl ethyl ketone, dried and subjected to ultraviolet radiation for the dosages listed in the following table. A fully saturated polyurethane paint was applied in its normal form and with additions of methacrylic acid monomer as listed in the table. The coated surfaces were cured for 15 minutes at 180° F. and subjected to the cross hatch paint adhesion test. It is to be noted that the addition of the methacrylic acid monomer remarkably reduced the amount of radiation required to secure firm adhesion of the fully saturated polyurethane paint.

TABLE IX

| Exp. No. | Substrate | Photosensitizer | Post-irradiation treatment | Radiation dosage (watt-sec./sq. ft.) | Paint | Percent paint failure |
|---|---|---|---|---|---|---|
| 1 | High-density polyethylene | 3 minute dip in trichloroethylene | None | 3,200 | Two-part epoxy coating | 0 |
| 2 | do | do | do | 6,400 | do | 0 |
| 3 | do | do | do | 12,800 | do | 100 |
| 4 | do | do | do | 19,200 | do | 100 |
| 5 | do | do | Towel wiped after heating | 3,200 | do | 100 |
| 6 | do | do | do | 6,400 | do | 100 |
| 7 | do | do | do | 12,800 | do | 100 |
| 8 | do | do | Towel wiped before heating | 3,200 | do | 100 |
| 9 | do | do | do | 6,400 | do | 100 |
| 10 | do | do | do | 12,800 | do | 100 |
| 11 | do | do | Wiped with perchloroethylene before heat treatment | 3,200 | do | 100 |
| 12 | do | do | do | 6,400 | do | 100 |
| 13 | do | do | do | 12,800 | do | 100 |
| 14 | do | do | Solvent wiped with perchloroethylene after heating | 3,200 | do | 100 |
| 15 | do | do | do | 6,400 | do | 75-80 |
| 16 | do | do | do | 12,800 | do | 100 |
| 17 | do | 6 minute dip in trichloroethylene | None | 12,800 | do | 15-20 |
| 18 | do | do | Towel wiped before heating | 12,800 | do | 100 |
| 19 | do | do | Towel wiped after heating | 12,800 | do | 100 |
| 20 | do | 12 minute dip in trichloroethylene | None | 12,800 | do | 80 |
| 21 | do | do | Towel wiped before heating | 12,800 | do | 100 |
| 22 | do | do | Towel wiped after heating | 12,800 | do | 100 |
| 23 | do | 3 3-minute dips in trichloroethylene | None | 3,200 | do | 3-4 |

EXAMPLE X

Polyethylene plaques were brushed with a 2% solution of benzophenone in methyl ethyl ketone, dried and subjected to ultraviolet radiation for the dosages listed in the following table. A polymethyl methacrylate primer, substantially free from monomer, was applied to the radiated surfaces, with the primer in its normal form and with additions of methacrylic acid monomer as listed in the table. The coated surfaces were cured for 15 minutes at 180° F. and subjected to the cross hatch paint adhesion test. It is to be noted that the addition of the methacrylic acid monomer remarkably reduced the amount of radiation required to secure firm adhesion of the primer.

TABLE X

| Exp. No. | Substrate | Radiation dosage watt-sec./sq. ft. | Paint | Percent acrylic monomer | Percent paint failure |
|---|---|---|---|---|---|
| 1 | High-density polyethylene | 320 | Acrylic | 0 | 100 |
| 2 | do | 800 | do | 0 | 85 |
| 3 | do | 1,600 | do | 0 | 50 |
| 4 | do | 2,400 | do | 0 | 10 |
| 5 | do | 3,200 | do | 0 | 0 |
| 6 | do | 320 | do | 0.05 | 100 |
| 7 | do | 800 | do | 0.05 | 85 |
| 8 | do | 1,600 | do | 0.05 | 15 |
| 9 | do | 2,400 | do | 0.05 | 0 |
| 10 | do | 3,200 | do | 0.05 | 0 |
| 11 | do | 320 | do | 0.10 | 100 |
| 12 | do | 800 | do | 0.10 | 85 |
| 13 | do | 1,600 | do | 0.10 | 0 |
| 14 | do | 2,400 | do | 0.10 | 0 |
| 15 | do | 3,200 | do | 0.10 | 0 |

TABLE XI

| Exp. No. | Substrate | Radiation dosage watt-sec./sq. ft. | Paint | Percent acrylic monomer | Percent paint failure |
|---|---|---|---|---|---|
| 1 | High density polyethylene | 32 | Polyurethane | 0 | 100 |
| 2 | do | 80 | do | 0 | 100 |
| 3 | do | 1,600 | do | 0 | 100 |
| 4 | do | 2,400 | do | 0 | 60 |
| 5 | do | 3,200 | do | 0 | 10 |
| 6 | do | 6,400 | do | 0 | 5 |
| 7 | do | 12,800 | do | 0 | 0 |
| 8 | do | 32 | do | 0.05 | 100 |
| 9 | do | 80 | do | 0.05 | 100 |
| 10 | do | 1,600 | do | 0.05 | 100 |
| 11 | do | 2,400 | do | 0.05 | 60 |
| 12 | do | 3,200 | do | 0.05 | 10 |
| 13 | do | 6,400 | do | 0.05 | 0 |
| 14 | do | 12,800 | do | 0.05 | 0 |
| 15 | do | 32 | do | 0.10 | 100 |
| 16 | do | 80 | do | 0.10 | 100 |
| 17 | do | 1,600 | do | 0.10 | 85 |
| 18 | do | 2,400 | do | 0.10 | 50 |
| 19 | do | 3,200 | do | 0.10 | 5 |
| 20 | do | 6,400 | do | 0.10 | 0 |
| 21 | do | 12,800 | do | 0.10 | 0 |

EXAMPLE XII

A series of high-density polyethylene plaques were brushed with a 2% solution of benzophenone in methylene chloride, dried for 1 minute and subjected to ultraviolet radiation for the dosages listed in the following table. Thereafter, the radiated surfaces were coated as indicated in the table with a commerical acrylic paint containing less than 1/10% of monomer material, or with a curing-type polyurethane paint comprising a solution of an —OH terminated urethane polymer derived from reaction of an isocyanate with an alkyd, and a melamine formaldehyde resin curing agent. The surfaces painted with acrylic paint were cured for 20 minutes at 160° F. and the surfaces coated with urethane paint were cured for 30 minutes at 212° F.

A second series of high-density polyethylene plaques were dipped in trichloroethylene for 3 minutes and subjected to ultraviolet radiation for the dosages listed in the table and these radiated surfaces were coated with the paints used in the initial series and cured for 20 minutes at 160° F.

The plaques of the two series were subejcted to the cross hatch paint adhesion test after the curing step and after periods of immersion of 24 hours and 96 hours in water at 120° F. The results are listed in the table.

It will be seen that the surfaces radiated with the assistance of benzophenone had a remarkably superior resistance to loosening on immersion in water than did the surfaces radiated with the assistance of trichloroethylene. This is due to the development of an hydrophilic layer by the action of ultraviolet radiation on the polyethylene surface in the presence of the chlorinated material.

agent was an aliphatic amine. The epoxy coated surfaces were cured for 15 minutes at 180° F.

TABLE XIII

| Exp. No. | Substrate | Photosensitizer | Paint | Radiation dosage (watt-sec./sq. ft.) | Percent failure |
|---|---|---|---|---|---|
| 1 | High-density polyethylene. | Anthrone | Polyurethene | 3,200 | 85 |
| 2 | do | do | do | 6,400 | 0 |
| 3 | do | do | do | 12,800 | 0 |
| 4 | do | Xanthen-9-one | do | 3,200 | 60 |
| 5 | do | do | do | 6,400 | 0 |
| 6 | do | do | do | 12,800 | 0 |
| 7 | do | Acenaphthene | do | 3,200 | 100 |
| 8 | do | do | do | 6,400 | 75 |
| 9 | do | do | do | 12,800 | 0 |
| 10 | do | Anthrone | Acrylic | 3,200 | 0 |
| 11 | do | do | do | 6,400 | 0 |
| 12 | do | Xanthen-9-one | do | 3,200 | 0 |
| 13 | do | do | do | 6,400 | 0 |
| 14 | do | Acenaphthene | do | 3,200 | 0 |
| 15 | do | do | do | 6,400 | 0 |
| 16 | do | do | 2-part epoxy | 3,200 | 0 |

TABLE XII

| Exp. No. | Substrate | Photosensitizer | Radiation dosage (watt-sec./sq. ft.) | Paint | Time of immersion in water | Percent paint failure |
|---|---|---|---|---|---|---|
| 1 | High density polyethylene | Benzophenone | 3,200 | Acrylic | 0 | 0 |
| 2 | do | do | 3,100 | Urethane | 0 | 10 |
| 3 | do | do | 6,400 | do | 0 | 0-5 |
| 4 | do | Trichloroethylene | 3,200 | Acrylic | 0 | 5 |
| 5 | do | do | 3,200 | Urethane | 0 | 50 |
| 6 | do | do | 6,400 | do | 0 | 90 |
| 7 | do | Benzophenone | 3,200 | Acrylic | 0 | 0 |
| 8 | do | do | 3,200 | Urethane | 24 | 25 |
| 9 | do | do | 6,400 | do | 24 | 0-5 |
| 10 | do | Trichloroethylene | 3,200 | Acrylic | 24 | 10 |
| 11 | do | do | 3,200 | Urethane | 42 | 100 |
| 12 | do | do | 6,400 | do | 24 | 100 |
| 13 | do | Benzophenone | 3,200 | Acrylic | 96 | 0 |
| 14 | do | do | 3,200 | Urethane | 96 | 50 |
| 15 | do | do | 6,400 | do | 96 | 0-5 |
| 16 | do | Trichloroethylene | 3,200 | Acrylic | 96 | 35-40 |
| 17 | do | do | 3,200 | Urethane | 96 | 100 |
| 18 | do | do | 6,400 | do | 96 | 100 |

EXAMPLE XIII

A series of high density polyethylene plaques were brushed with 2% solution of various photosensitizers in methylene chloride as listed in the following table. After drying the plaques for 1 minute, the plaques were subjected to ultraviolet radiation for the dosages listed in the table. The radiated surfaces were then wiped with methylene chloride, dried and coated with either a polyurethane paint, an acrylic or an epoxy paint. The polyurethane paint was a one-part, heat-curable material based on an hydroxyl terminated isocyanate reacted alkyd and a melamine formaldehyde curing agent. The plaques coated with this paint were cured for 30 minutes at 212° F. The acrylic paint was a commercial sealer coat based on polymethyl methacrylate. Plaques coated with this paint were cured for 120 minutes at 160° F. The epoxy coating was a two-part system in which curing

EXAMPLE XIV

A series of high density polyethylene plaques were brushed with a 2% solution of benzophenone in methylene chloride, dried for 1 minute and then painted with pigmented polyurethane and acrylic paints. The coatings were allowed to stand at room temperature for ½ hour to remove volatile components from the paint and were then subjected to ultraviolet radiation for dosages as listed in the following table. Thereafter, the polyurethane coated surfaces were subjected to a cure of 30 minutes at 212° F. and the acrylic coated surfaces were subjected to a 20 minute cure at 160° F. In further tests as noted in the table, the paint was subjected to the curing before ultraviolet radiation.

TABLE XIV

| Exp. No. | Substrate | Radiation dosage (watt-sec./sq. ft.) | Paint | Radiation before curing | Radiation after curing | Photosensitizer | Percent failure |
|---|---|---|---|---|---|---|---|
| 1 | High-density polyethylene | 3,200 | Polyurethane | 3,200 | | Benzophenone | 100 |
| 2 | do | 6,400 | do | 6,400 | | do | 100 |
| 3 | do | 9,600 | do | 9,600 | | do | 100 |
| 4 | do | 12,800 | do | 12,800 | | do | 100 |
| 1 | do | 3,200 | do | | 3,200 | do | 100 |
| 2 | do | 6,400 | do | | 6,400 | do | 100 |
| 3 | do | 9,600 | do | | 9,600 | do | 100 |
| 4 | do | 12,800 | do | | 12,800 | do | 100 |
| 1 | do | 3,200 | Acrylic | 3,200 | | do | 100 |
| 2 | do | 6,400 | do | 6,400 | | do | 100 |
| 3 | do | 9,600 | do | 9,600 | | do | 100 |
| 4 | do | 12,800 | do | 12,800 | | do | 100 |
| 1 | do | 3,200 | do | | 3,200 | do | 100 |
| 2 | do | 6,400 | do | | 6,400 | do | 100 |
| 3 | do | 9,600 | do | | 9,600 | do | 100 |
| 4 | do | 12,800 | do | | 12,800 | do | 100 |

Having thus described my invention what I claim as new and desire to secure by Letters Patent of the United States is:

1. The process of coating the surface of a body of a polymer resin having at least some hydrogen on a carbon chain in a repeating unit in the polymeric chain and having a critical surface tension of wetting of not more than 35 dynes per centimeter, said surfaces being selected from the group consisting of surfaces of bodies of resinous polyvinyl fluoride, polyvinylidene fluoride, polyolefins, copolymers of ethylene or propylene with vinyl acetate or ethyl acrylate, copolymers of ethylene and propylene containing a small proportion of a non-conjugated diene and molded surfaces of bodies of resins from the group consisting of polyacetal resins, polyamide resins, polycaprolactam resins, polyurethane resins, and ionomer resins, said process comprising the steps of providing a photosensitizer having a triplet state energy of at least about 62 kcal./mole at the surface to be coated of said polymeric material, irradiating said surface with ultraviolet light in the range of about 2000 A. to about 3500 A. to the extent of at least about 1000 watt seconds to form a cross linked surface integral with the body of resin and concurrently to generate free radicals in surface molecules of said polymeric material, thereafter applying to said surface a synthetic polymer resin base coating composition, said composition containing substantially no reactive or residual unsaturated groups which will combine with the surface through the action of said free radicals.

2. The process of coating a polymer resin as defined in claim 1 in which said photosensitizer is a member of the group consisting of ketone photosensitizers and hydrocarbon multiple ring compound photosensitizers.

3. The process of coating a polymer resin as defined in claim 2 in which said radiation provides at least 1000 watt seconds radiation at a wave length of from about 2000 to about 2800 A. at the surface of said resin and in which the polyolefin is a member of the group consisting of polyethylene, polypropylene and copolymers of ethylene and propylene.

4. The process of coating a polymer resin as defined in claim 3 in which said coating composition comprises a saturated member of the group consisting of polymers and copolymers of lower alkyl esters of acrylic acid and methacrylic acid.

5. The process of coating a polymer resin as defined in claim 3 in which said coating composition is a paint of which the vehicle comprises in substantially stoichimetric proportions a saturated glycidyl polyether of bisphenol-A and a member of the group consisting of aliphatic diamines, cycloaliphatic diamines, amino terminated aliphatic polyamides and amino terminated cycloaliphatic polyamides said coating composition containing substantially no residual epoxide groups.

6. The process of coating a polymer resin as defined in claim 3 in which said coating composition is a saturated polyurethane paint containing substantially no residual —NCO.

7. A process of coating a polymer resin as defined in claim 6 in which said coating composition is a heat-curable paint comprising a mixture of an hydroxyl terminated isocyanate-reacted alkyd and a melamine formaldehyde curing agent.

8. The process of coating a polymer resin as defined in claim 3 in which said coating composition is a pigmented substantially opaque paint.

References Cited
UNITED STATES PATENTS

| | | | |
|---|---|---|---|
| 3,227,605 | 1/1966 | Wolinski | 117—47 A |
| 3,088,791 | 5/1963 | Cline et al. | 117—93.31 |
| 3,188,228 | 6/1965 | Magat et al. | 117—93.31 |

FOREIGN PATENTS 856,884  12/1960  Great Britain __ 117—93.31 DF

WILLIAM D. MARTIN, Primary Examiner

J. H. NEWSOME, Assistant Examiner

U.S. Cl. X.R.

117—76 F, 93.31, 138.8 E, 138.8 A, 138.8 D, 138.8 N, 161 KP, 161 L, 161 ZB, 161 UB, 161 UC, 161 UZ, 138.8 UF

FO-1050
(5/69)

UNITED STATES PATENT OFFICE
CERTIFICATE OF CORRECTION

Patent No. 3,764,370            Dated October 9, 1973

Inventor(s) Robert A. Bragole

It is certified that error appears in the above-identified patent and that said Letters Patent are hereby corrected as shown below:

Column 1, BACKGROUND OF THE INVENTION, change BACKG ROUND to --BACKGROUND--

Column 4,

Line 63, Change very to --vary--

Column 5, Line 56, Change meling to --melting--

Column 7, Line 11, after treatment, and before commercial insert --a--

Line 12, Change acrylatee to --acrylate--

Line 13, after surface (first occurence), delete --and the surface--

Columns Table IX, Exp. No. 5, Under Post-irradiation
11 & 12, treatment, change heat ng to --heating--

Columns Table XII, Exp. No. 2, under Radiation dosage
13 & 14 (watt-sec./sq. ft.), Change 3,100 to --3,200--

Exp. No. 7, under Time of immersion in water, change 0 to --24--

Exp. No. 11, under Time of immersion in water, change 42 to --24--

PO-1050
(5/69)

UNITED STATES PATENT OFFICE
CERTIFICATE OF CORRECTION

Patent No. 3,764,370            Dated October 9, 1973

Inventor(s) Robert A. Bragole            Page - 2

It is certified that error appears in the above-identified patent and that said Letters Patent are hereby corrected as shown below:

In the claims:

Claim 4, Column 16, Line 1, after a and before member, delete --saturated--

Signed and sealed this 26th day of March 1974.

(SEAL)
Attest:

EDWARD M. FLETCHER, JR.           C. MARSHALL DANN
Attesting Officer            Commissioner of Patents

UNITED STATES PATENT OFFICE
CERTIFICATE OF CORRECTION

Patent No. 3,764,370          Dated October 9, 1973

Inventor(s)   Robert A. Bragole

It is certified that error appears in the above-identified patent and that said Letters Patent are hereby corrected as shown below:

Column 15, line 22, after "watt seconds" insert --per square foot--

Line 37, after "watt seconds" insert --per square foot--

Signed and Sealed this twenty-third Day of March 1976

[SEAL]

Attest:

RUTH C. MASON
Attesting Officer

C. MARSHALL DANN
Commissioner of Patents and Trademarks